United States Patent [19]

Steuer

[11] 4,276,041
[45] Jun. 30, 1981

[54] CHAIN FOR FRICTION PULLEY TRANSMISSION

[75] Inventor: Herbert K. Steuer, Bad Homburg, Fed. Rep. of Germany

[73] Assignee: P.I.V. Antrieb Werner Reimers Kommanditgesellschaft, Bad Homburg, Fed. Rep. of Germany

[21] Appl. No.: 92,068

[22] Filed: Nov. 7, 1979

[30] Foreign Application Priority Data

Nov. 7, 1978 [DE] Fed. Rep. of Germany ....... 2848166

[51] Int. Cl.³ .............................................. F16G 5/20
[52] U.S. Cl. ...................................... 474/243; 474/8
[58] Field of Search ............... 474/201, 212, 213, 153, 474/167, 242, 243, 244, 8

[56] References Cited

U.S. PATENT DOCUMENTS

| | | | |
|---|---|---|---|
| 3,016,755 | 1/1962 | Dittrich | 474/201 |
| 3,049,933 | 8/1962 | Besel | 474/201 |
| 3,089,346 | 5/1963 | Dittrich et al. | 74/236 |
| 3,138,034 | 6/1964 | Dittrich et al. | 474/201 |
| 3,353,421 | 11/1967 | Ketterle et al. | 74/253 |
| 3,364,767 | 1/1968 | Bredschneider et al. | 74/236 |
| 3,407,672 | 10/1968 | Keller | 474/242 |
| 3,916,709 | 11/1975 | Steuer et al. | 74/253 R |

FOREIGN PATENT DOCUMENTS

| | | | |
|---|---|---|---|
| 23335 | 6/1959 | Fed. Rep. of Germany | 474/243 |
| 1979429 | 2/1968 | Fed. Rep. of Germany | . |
| 2116930 | 7/1976 | Fed. Rep. of Germany | . |
| 712876 | 8/1931 | France | 474/243 |
| 811372 | 1/1937 | France | 474/242 |

Primary Examiner—C. J. Husar
Assistant Examiner—Conrad Berman
Attorney, Agent, or Firm—Spencer & Kaye

[57] ABSTRACT

In a thrust piece forming a component of a chain for use in a friction pulley transmission in which the chain extends around, and circulates between, pairs of pulleys mounted on associated shafts, with one pulley of each pair being a cone pulley having a conical friction face and the other pulley of each pair being a friction pulley having a friction face which is flatter than that of the associated cone pulley, the thrust piece extending substantially transversely of the length of the chain and presenting opposed end faces via which the thrust piece bears against the friction faces of a pulley pair to effect friction force transmission between the pulley pair and the chain, one end face of the thrust piece, which contacts the friction pulley of a pulley pair, is formed to present an area of contact with the friction pulley which is reduced in relation to the area of contact between the other end face of the thrust piece and the cone pulley of the pulley pair.

2 Claims, 9 Drawing Figures

CHAIN FOR FRICTION PULLEY TRANSMISSION

BACKGROUND OF THE INVENTION

The present invention relates to a chain for friction pulley transmissions in which the chain circulates between pairs of friction pulleys arranged on drive-input and drive-output shafts, respectively, one pulley of each pair being formed as a cone pulley and the other pulley as a friction pulley having a friction surface which is radial or flatly conical in relation to the cone pulley.

Chains of the type to which the invention is directed include thrust pieces extending substantially transversely of the longitudinal direction of the chain for effecting friction force transmission between the friction pulleys and the chain. The end faces of these thrust pieces abut against the friction pulleys.

Such chains are known in many forms. Thus, by way of example, U.S. Pat. No. 3,089,346 describes a chain the links of which are formed by packs of side bars while either the thrust pieces pass through the packs of side bars between the articulations or the joint pieces themselves function as thrust pieces. Forms of construction similar thereto are disclosed in U.S. Pat. Nos. 3,364,767; 3,353,421; and 3,916,709.

Another form of construction is disclosed in FRG Auslegeschrift (Published Application) No. 2,116,930. There the basic body of a looping means is formed by steel strips which are joined in a closed loop to one another and onto which thrust pieces are fitted in the form of transverse members.

Thus, the invention relates to all chains with thrust pieces for friction force transmission. Only the so-called ring roller chains, such as are disclosed, for example, in German Gebrauchsmuster (Utility Model Patent) No. 1,979,429 are to be excluded.

In the known chains, the thrust pieces, seen in the radial direction, have domed end faces which are of like formation at both ends of the thrust pieces. Thus, in friction pulley transmissions with a cone pulley and a friction pulley differing therefrom with respect to the inclination of its friction face, different contact areas occur between the friction pulleys and chain, or an asymmetric pulley V-gap results. This results in a reduction of the transmittable power in comparison with those transmissions where the two friction pulleys of a pair are formed as cone pulleys of like configuration. On the other hand, in many cases it is of interest to use a friction pulley transmission of the initially stated type in order to conform to space limitations. The type of use encountered most frequently involves so-called two-belt transmissions where the two outer pulleys, in the direction of the axis of the associated shaft, of a pulley set are formed as cone pulleys while the middle pulley has a friction surface which is radial or flatly conical in relation to each cone pulley.

SUMMARY OF THE INVENTION

It is an object of the present invention to permit the full power transmission capability of a chain of the initially stated kind to be realized. A related object of the invention is to avoid the necessity for additional parts for the chain.

Attainment of these objects is based upon the knowledge that the sacrifice of power transmission capacity in the prior art is caused by the friction pulley whose friction face is radial or only slightly conical in relation to the cone pulley, although there the mating between friction pulley and thrust pieces leads to a contact area which is larger than that established with the cone pulley.

The objects according to the invention are achieved, in a chain of the type described initially herein by forming the end faces of the thrust pieces which come into abutment with the friction pulleys having friction surfaces which are radial or only slightly conical compared to the cone pulleys so their contact area in the radial and/or circumferential direction is reduced in comparison with the contact area associated with their opposite end faces.

This has the surprising effect that, despite the reduction of the contact area of the thrust pieces, the stated sacrifice of power transmission capacity is eliminated. The only explanation developed this far is that the contact area reduction in accordance with the invention creates equal pressure application conditions in relation to the respective friction pulleys at both ends of the thrust pieces.

It has proved especially advantageous to form the thrust pieces with like end faces at both ends. This greatly simplifies assembly of the chains since attention does not have to be given to the direction in which each thrust piece is oriented for insertion.

DESCRIPTION OF THE PREFERRED EMBODIMENTS

Figure 1:
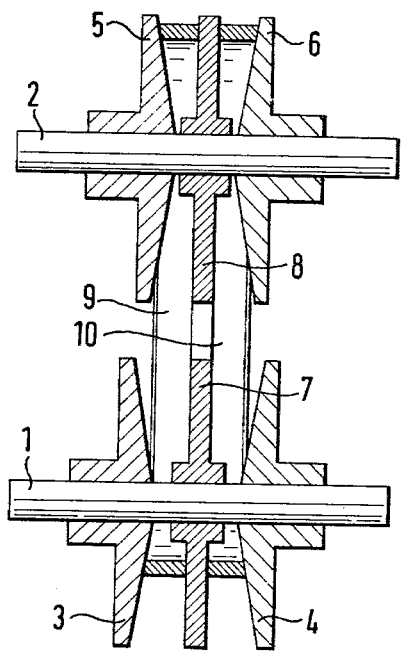
FIG. 1 is a simplified elevational, cross-sectional view of a two-belt transmission of the type to which the present invention is applicable.

FIG. 1 shows, in simplified form, a two-belt transmission composed of cone pulleys 3 and 4 mounted on a shaft 1 and cone pulleys 5 and 6 mounted on a shaft 2. A friction pulley 7 is arranged centrally between the cone pulleys 3 and 4 and a friction pulley 8 between the cone pulleys 5 and 6. The friction faces of friction pulleys 7 and 8 extend substantially radially. Transmission means 9 and 10 in the form of chains circulate between these friction pulleys.

While the friction faces of discs 7 and 8 are shown as extending substantially radially, i.e. as lying in substantially flat planes, these surfaces may also be slightly conical. In this sense, "slightly conical" is intended to mean the form of a cone having a small height along its axis, or in which the linear generatrix of the cone forms with the conic axis a large angle close to 90° and, in any event, larger than, and preferably substantially larger than, the angles defined between the linear generatrices and conical axes of the friction faces of cone pulleys 3-6.

Figure 2:
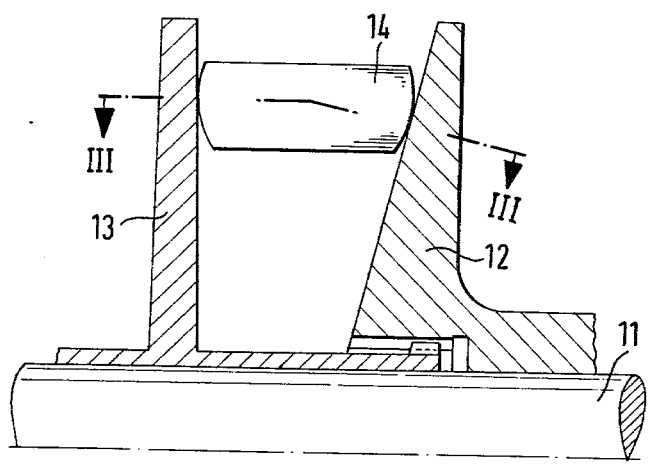
FIG. 2 is a cross-sectional, detail view, to an enlarged scale, of a portion of one pulley unit of the transmission of FIG. 1 taken along line II—II of FIG. 3.
Figure 3:
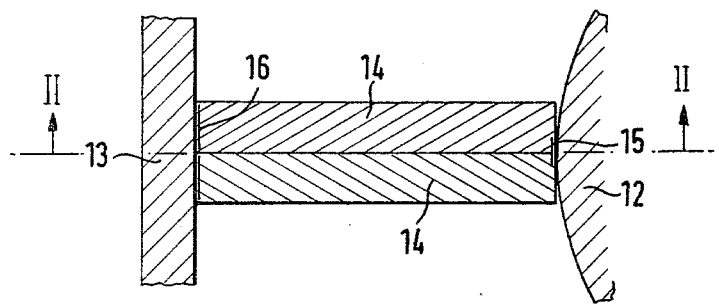
FIG. 3 is a cross-sectional view along the line III—III of FIG. 2.

FIG. 2 shows a portion of one pulley pair mounted on a shaft 11 and composed of a cone pulley 12 and a friction pulley 13 with a substantially radial friction surface, between which a thrust piece 14 is interposed with its ends in abutment with the pulley friction surfaces. As may be seen from FIG. 2 the thrust piece has end faces of like configuration at both ends. As may be seen from FIG. 3 which shows two associated thrust pieces 14, these lead, however, to contact areas 15 and 16 of respectively different sizes, the contact areas 15 being smaller than the contact areas 16. The difference in contact area size is, of course, due to the difference in inclination between the two pulley friction surfaces.

Figure 4:
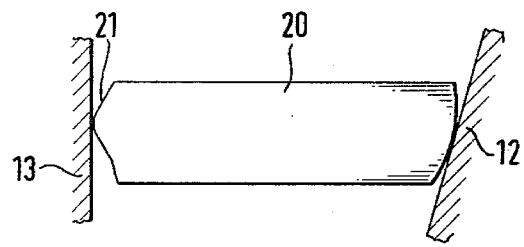
FIGS. 4 and 5 are side elevational detail views of two preferred embodiments of thrust pieces with end face reduction in the radial direction according to the invention.
Figure 5:
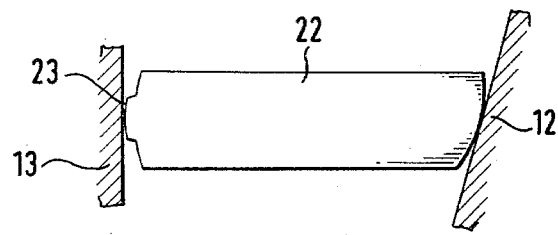

FIG. 4 shows an embodiment of a thrust piece 20 according to the invention in which the end face 21 coming into contact with the friction pulley 13 is reduced in the radial direction of the pulley friction face by removal of material in the region of the end face. FIG. 5 illustrates a similar approach in which a somewhat different configuration is given to the end face 23 of a thrust piece 22.

Figure 6:
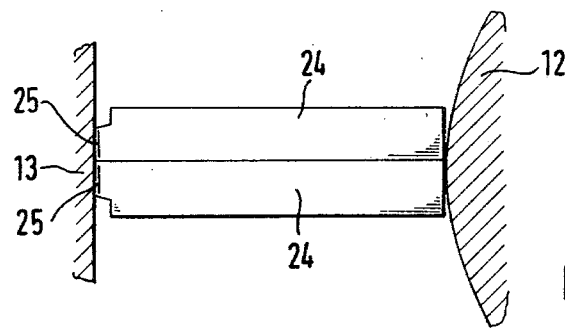
FIG. 6 is a view similar to that of FIG. 3 of a preferred embodiment of thrust pieces with end face limitation in the circumferential direction according to the invention.

FIG. 6 illustrates another embodiment of the invention in which end faces 25 of thrust pieces 24 are reduced in size in the circumferential direction of the friction faces of pulleys 12 and 13, by removal of material.

Figure 7A:
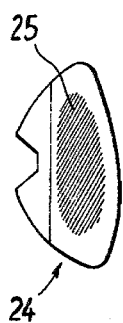
FIG. 7a is an end view showing the end face of a thrust piece of FIG. 6 formed according to the invention.

FIG. 7a shows, in an end view, the form of end face 25 of the embodiment shown in FIG. 6.

Figure 7B:
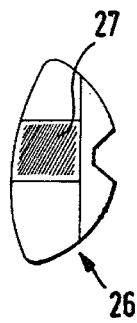
FIG. 7b is a view similar to that of FIG. 7a showing another embodiment of the invention.

FIG. 7b shows the end face 27 of another embodiment of a thrust piece 26 according to the invention in which material is removed from the end face to reduce the effective size of the end face in both the circumferential and radial directions of the friction face of the associated pulley 13. Thus, this embodiment constitutes a combination of the approach illustrated in FIGS. 6 and 7 with that shown in FIG. 5.

In FIGS. 7a and 7b, the resulting area of contact with pulley 13 is depicted by hatching.

Figure 8:
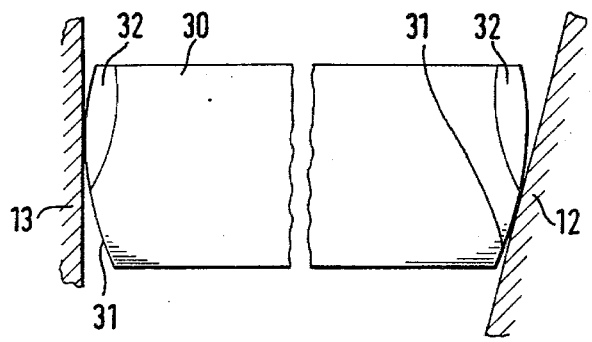
FIG. 8 is a view similar to that of FIGS. 4 and 5, but to a larger scale, of a preferred embodiment of a thrust piece according to the invention with identical end faces at both ends.
Figure 9:
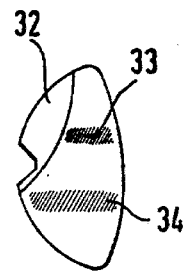
FIG. 9 is an end view of the thrust piece of FIG. 8.

FIGS. 8 and 9 show an embodiment of a thrust piece 30 in which the end faces 31 at both ends are of identical, but mirror-image, configuration. For this purpose a cutaway portion 32 is provided at both ends of the thrust piece so that the contact area 33 with the friction pulley 13 is reduced while the contact area 34 with the cone pulley 12 corresponds to that conventionally provided.

The drawings show embodiments according to the invention in the form of rocker pieces which at the same time form the articulation bearings of a side bar chain. Of course, the measures as illustrated are, however, also correspondingly possible in the case of thrust pieces of different types of all metal chains.

Theoretically, it might appear contact between the pulleys and the thrust pieces occurs only at points or along lines, at least under no load conditions. In practice, however, each contact will cover a certain area at the ends of the thrust pieces as a result of elastic deformations at the contact regions, as well as wear.

It will be understood that the above description of the present invention is susceptible to various modifications, changes and adaptations, and the same are intended to be comprehended within the meaning and range of equivalents of the appended claims.

What is claimed is:

1. In a thrust piece forming a component of a chain for use in a friction pulley transmission in which the chain extends around, and circulates between, pairs of pulleys mounted on associated shafts, with one pulley of each pair being a cone pulley having a conical friction face and the other pulley of each pair being a friction pulley having a friction face which is flatter than that of the associated cone pulley, the thrust piece extending substantially transversely of the length of the chain and presenting opposed end faces via which the thrust piece bears against the friction faces of a pulley pair to effect friction force transmission between the pulley pair and the chain, the improvement wherein one said end face of said thrust piece, which contacts the friction pulley of a pulley pair, is formed to present an area of contact with the friction pulley which is reduced in relation to the area of contact between the other said end face of said thrust piece and the cone pulley of the pulley pair.

2. A thrust piece as defined in claim 1 wherein both said end faces have like configurations.

* * * * *